Sept. 13, 1938.  W. G. BURNS  2,129,673
ROASTING METHOD AND APPARATUS
Filed Nov. 25, 1936
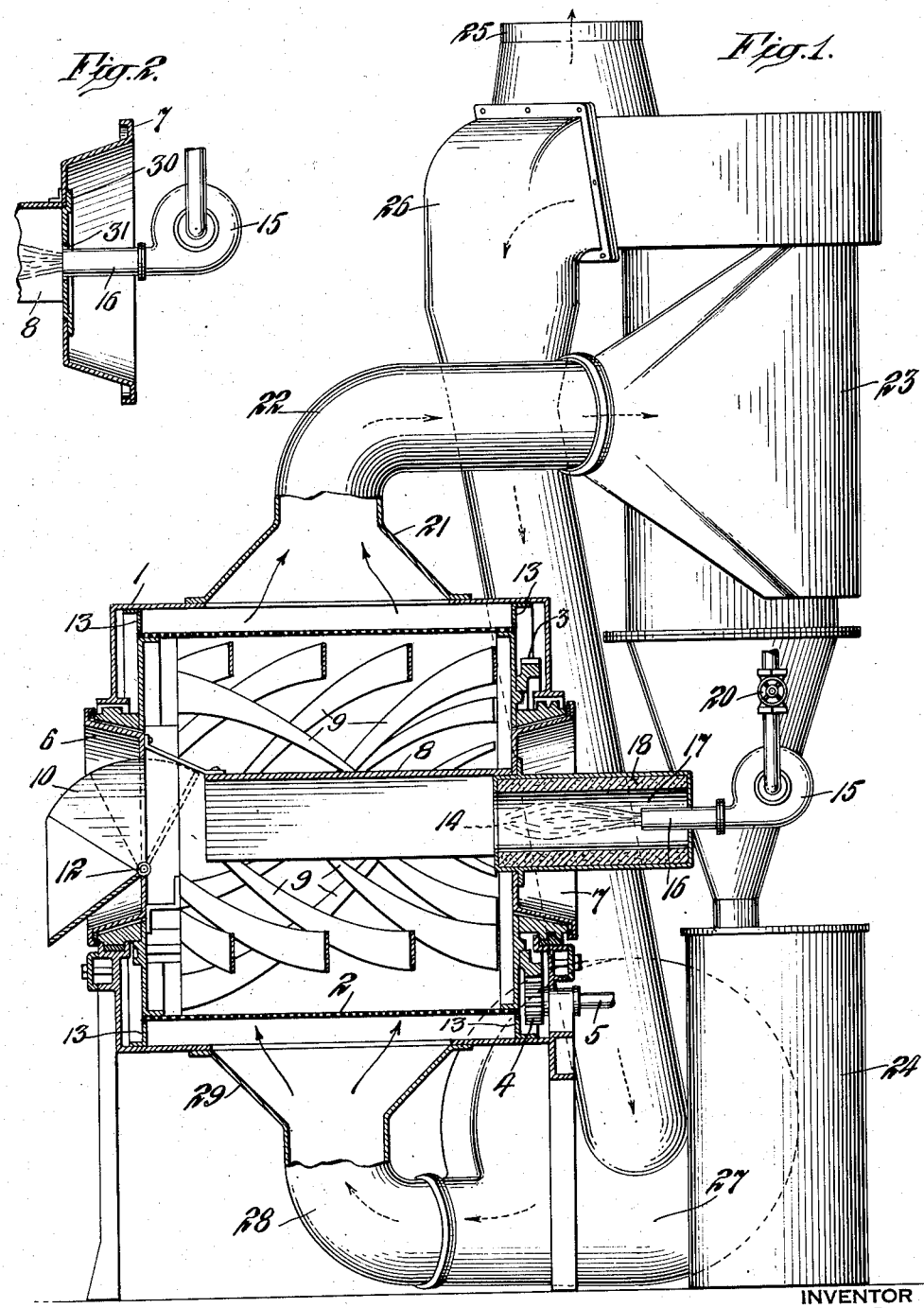
INVENTOR
WILLIAM G. BURNS
BY Sager & Malcolm
ATTORNEYS Patented Sept. 13, 1938

2,129,673

UNITED STATES PATENT OFFICE 2,129,673

ROASTING METHOD AND APPARATUS

William G. Burns, New York, N. Y., assignor to Jabez Burns & Sons, Inc., New York, N. Y., a corporation of New York Application November 25, 1936, Serial No. 112,630

7 Claims. (Cl. 34—5)

This invention relates to a method and apparatus for roasting coffee, cocoa beans, peanuts, cereals, and similar edible bean-like materials whereby the finished goods are improved in appearance, development and flavor; the risk of scorching or "spotting" is eliminated; the cost of roasting is reduced; and the department in which the roasting work is done is more easily maintained at a comfortable temperature.

A feature of the invention resides in continuously recirculating a stream of gas through the material in a roasting chamber, and continuously introducing heat units into said chamber independently of the recirculating stream of gas. In the preferred form of the invention disclosed herein for purposes of illustration, the roasting chamber contains an apertured rotatable drum or carrier for the material to be roasted; and a duct system for the recirculating gases opens into the roasting chamber preferably at diametrically opposite portions of the drum in such a way that gases passing through the roasting chamber are distributed substantially uniformly through all parts of the drum and the material therein. An exhaust fan continuously recirculates a stream of gas through the duct system and the roasting chamber, and the duct system may contain a collector for separating out of the stream the skin, hulls and light trash which are released by the material and carried out of the roasting chamber during the roasting operation. In roasters of the type disclosed in Patent #1,532,574, later referred to, gases for cylinder ventilation are drawn from the room, pass through the material and are heated, and are then withdrawn from the roaster cylinder and exhausted into the atmosphere. The heat units contained in such gases are lost. In my invention a constant volume of such gases is circulated through the material at a temperature considerably above that of the roasting room, and the heat value therein is not wasted.

An important advantage of the invention is that it permits the use of a low temperature gaseous heating medium and avoids burning or scorching of the chaff, surface waxes, etc. of the material under treatment, so that the quality, uniformity and appearance of the product are enhanced; and, by circulating the gas stream through the material under treatment in sufficiently large volume and at high velocity to insure large volume heat transfer, the material is roasted in a much shorter period of time, with resulting economy of fuel, than when previous methods of direct heat treatment are employed.

These and other features and advantages of the invention will be described in connection with the accompanying drawing, in which:

Fig. 1 is a longitudinal vertical sectional view through a roaster embodying the invention; and Fig. 2 is a detail section illustrating a modification in the arrangement of the heating means.

The roaster shown in the drawing is similar in general construction to that disclosed in Burns and Maxon Patent #1,532,574, issued April 7, 1925.

The roaster has an insulated casing 1 in which is mounted a rotary apertured or perforated drum 2 adapted to hold the material to be roasted. Gear 3 is mounted on one end of drum 2 and cooperates with pinion 4 on shaft 5 which is driven by any suitable source of power for the purpose of rotating the drum.

The ends of casing 1 and drum 2 are closed by stationary disks 6 and 7 which are bolted or otherwise secured to the frame. Within the central portion of the drum and supported from disks 6 and 7 is a tent-shaped spreader 8. A plurality of lifting vanes 9 are arranged inside drum 2 for the purpose of carrying the material from the bottom to the top and constantly agitating the beans and dropping them on the spreader 8 during the roasting operation. The spreader 8 may sometimes be omitted if desired.

At the front end of the roaster I provide a filling and emptying gate 10 pivoted to disk 6 at 12. During the roasting operation the gate 10 is maintained in a vertical position, effectively sealing the opening in disk 6 so that there is no interference with the circulation of gases hereinafter described. End shields 13 attached to the casing 1 enclose each end of drum 2, preventing the circulating gases from passing through the space between the ends of the casing and the ends of the drum.

The heating flame 14 may be provided by a burner of any suitable type such as a motor-driven blower 15 arranged to mechanically premix gas with the proper volume of air for most efficient combustion and discharge the mixture through nozzle 16 which is disposed in heating chamber 17 adjacent the roasting chamber as shown in Fig. 1. Heating chamber 17 preferably has an inner lining 18 of fire clay or other refractory or heat-resisting material and opens into the rear end of drum 2 in axial alignment therewith beneath spreader 8. A temperature indicating device (not shown) may be mounted beneath the spreader 8 adjacent heating chamber 17 in any suitable manner for the purpose of indicating the temperature which may be adjusted as desired by means of valve 20 in the gas line.

The top of roaster casing 1 opens into a sloping hood 21 which is connected by pipe 22 to the inlet of a separator 23. This separator may be of any suitable type for removing chaff and light trash which drop into receptacle 24. The top of the separator 23 opens into a vent pipe 25 for discharging excess gases to the atmosphere, and into a return pipe 26 which is connected to the inlet side of an exhaust fan 27. Return pipe 26 preferably contains a suitable damper for controlling the flow of the recirculating gases. The outlet side of fan 27 is connected by pipe 28 to hood 29 opening into the bottom of the roaster casing 1.

In operation, a quantity of raw material is fed into the rotating drum 2, and the gate 10 is then closed. Fan 27 is started, setting up a circulation of air through the closed circuit; and the damper controlling the circulation of air is adjusted as desired. The heating element is turned on and regulated to supply heat at the rate which will complete the roast in a predetermined length of time. The gases circulate continuously through the roasting chamber independently of the heating medium, passing through the duct system including pipe 22, separator 23, return pipe 26, exhaust fan 27, and pipe 28 to the bottom of the roasting chamber, although it will be understood that the direction of circulation may be reversed if desired. Heat units are continuously fed into the roasting chamber axially of the drum 2 beneath spreader 8, entirely apart from the circulating gases. The gases are heated during their passage through the material which is being constantly agitated in the rotating drum.

Since the hoods 21 and 29 in the duct system slope gradually toward the respective ends of the roasting chamber, and preferably extend substantially the full length and breadth of the drum adjacent diametrically opposite portions of the drum, the gases entering the roasting chamber from pipe 28 are distributed in substantially uniform volume, velocity and temperature throughout the entire length and breadth of the roasting chamber, pass uniformly across drum 2, and are likewise withdrawn uniformly from the top of the roasting chamber through pipe 22 by the suction created by fan 27.

Fig. 2 shows a modification of the invention in which the heating chamber 18 is eliminated and the disk 7 at the back of the roaster is provided with a plate 30 having an opening 31 into which the burner nozzle 16 projects. In this form of the invention the gas flame is projected into the roasting chamber axially of the drum beneath the spreader 8 in the path of the stream of gas which is recirculated in the manner described above.

It will be evident that various changes may be made in the details of construction and method of operation disclosed herein without departing from the scope and spirit of the invention as defined in the appended claims.

The invention claimed is:

1. Method of roasting coffee, cocoa beans, peanuts, and similar bean-like materials in a roasting chamber, which comprises continuously recirculating a stream of gas through the material in said chamber, continuously introducing heat into said chamber independently of said stream of gas, and venting excess gases from the recirculating stream.

2. Method of roasting coffee, cocoa beans, peanuts, and similar bean-like materials in a roasting chamber, which comprises continuously recirculating a stream of gas through the material in said chamber, burning gas in a flame adjacent said chamber and outside the path of said recirculating stream of gas, continuously introducing the combustion products of said flame into said recirculating stream of gas, and venting excess gases from the recirculating stream.

3. In a roaster for coffee, cocoa beans, peanuts, and similar bean-like materials, a roasting chamber, means for continuously recirculating a stream of gas through said chamber, means for continuously introducing heat into said chamber independently of said stream of gas, and means for venting excess gases from said recirculating stream.

4. In a roaster for coffee, cocoa beans, peanuts, and similar bean-like materials, a roasting chamber, a heating chamber connected to said roasting chamber having means for passing heated gases directly into said roasting chamber, a duct system connected to said roasting chamber having means for continuously recirculating a stream of gas through said roasting chamber independently of said heating chamber, and means for venting excess gases from said duct system.

5. In a roaster for coffee, cocoa beans, peanuts, and similar bean-like materials, a roasting chamber, an apertured drum rotatably mounted therein, a duct system opening into said roasting chamber at diametrically opposite portions of said drum, means for continuously recirculating a stream of gas through said duct system and between the openings in said roasting chamber, means for continuously introducing heat into said chamber axially of said drum, and means for venting excess gases from said recirculating stream.

6. In a roaster for coffee, cocoa beans, peanuts, and similar bean-like materials, a roasting chamber, an apertured drum rotatably mounted therein, a duct system having openings into said roasting chamber extending substantially the full length and breadth of said drum at diametrically opposite portions of said drum whereby gases passed through said openings are distributed substantially uniformly through all parts of said drum, means for continuously recirculating a stream of gas through said duct system and said roasting chamber, means for continuously introducing heat into said chamber axially of said drum, and means for venting excess gases from said duct system.

7. In a roaster for coffee, cocoa beans, peanuts, and similar bean-like materials, a roasting chamber, an apertured drum rotatably mounted therein, a duct system having openings into said roasting chamber extending substantially the full length and breadth of said drum at diametrically opposite portions of said drum whereby gases passed through said openings are distributed substantially uniformly through all parts of said drum, means for continuously recirculating a stream of gases through said duct system and said roasting chamber, a heating chamber connected to said roasting chamber in alignment with the axis of said drum, means for producing a heating flame in said heating chamber for introducing heat into said roasting chamber independently of the recirculating stream of gas, and means for venting excess gases from said duct system.

WILLIAM G. BURNS.